United States Patent
Hamel et al.

(10) Patent No.: US 8,034,865 B2
(45) Date of Patent: Oct. 11, 2011

(54) SELF-LUBRICATING SURFACE COATING COMPOSITION

(75) Inventors: Gregg L. Hamel, Plantsville, CT (US); John H. Cowles, Jr., Somers, CT (US); Andrew Henn, Monroe, CT (US); Gisele Giguere, Waterbury, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 15 days.

(21) Appl. No.: 12/433,926

(22) Filed: May 1, 2009

(65) Prior Publication Data

US 2009/0275685 A1 Nov. 5, 2009

Related U.S. Application Data

(60) Provisional application No. 61/049,596, filed on May 1, 2008.

(51) Int. Cl.
*C08K 3/00* (2006.01)
*C08K 3/18* (2006.01)

(52) U.S. Cl. .................. 524/404; 524/430

(58) Field of Classification Search .......... 524/404
See application file for complete search history.

(56) References Cited

U.S. PATENT DOCUMENTS

| | | |
|---|---|---|
| 3,806,216 A | 4/1974 | Orkin et al. |
| 3,929,396 A | 12/1975 | Orkin et al. |
| 3,996,143 A | 12/1976 | Orkin et al. |
| 4,048,370 A | 9/1977 | Orkin et al. |
| 4,053,665 A | 10/1977 | Orkin et al. |
| 4,134,842 A | 1/1979 | Orkin et al. |
| 4,179,529 A | 12/1979 | Vetter |
| 4,180,598 A | 12/1979 | Emmons |
| 4,269,869 A | 5/1981 | Morohashi et al. |
| 4,453,988 A | 6/1984 | Slater et al. |
| 4,473,481 A | 9/1984 | Fukutsuka et al. |
| 4,717,268 A | 1/1988 | Orkin |
| 4,734,333 A | 3/1988 | Leo et al. |
| 4,842,424 A | 6/1989 | Narkon et al. |
| 5,137,374 A | 8/1992 | Orkin |
| 5,279,864 A | 1/1994 | Ohkita et al. |
| 5,407,601 A | 4/1995 | Furey et al. |
| 5,716,911 A | 2/1998 | Furey et al. |
| 5,792,717 A | 8/1998 | Takayama |
| 5,860,747 A | 1/1999 | Wan et al. |
| 6,085,797 A | 7/2000 | Grabaum et al. |
| 6,090,869 A | 7/2000 | Orkin et al. |
| 6,180,574 B1 * | 1/2001 | Ryan et al. .......... 508/106 |
| 6,231,931 B1 | 5/2001 | Blazey et al. |
| 6,395,822 B1 * | 5/2002 | Edgington .......... 524/523 |
| 6,432,490 B1 | 8/2002 | Rekowski et al. |
| 6,723,440 B2 | 4/2004 | Valeri et al. |
| 6,726,367 B2 | 4/2004 | Yamamoto et al. |
| 6,852,768 B2 | 2/2005 | Jin et al. |
| 6,887,520 B1 | 5/2005 | Paver et al. |
| 7,067,182 B2 | 6/2006 | Li et al. |
| 7,067,462 B2 | 6/2006 | Krohn |
| 7,067,565 B2 | 6/2006 | Valeri et al. |
| 7,528,189 B2 * | 5/2009 | Taylor et al. .......... 524/397 |
| 2004/0138072 A1 | 7/2004 | Levy |
| 2004/0209784 A1 | 10/2004 | Hardman et al. |
| 2005/0109990 A1 * | 5/2005 | Yeager et al. .......... 252/500 |
| 2007/0242912 A1 | 10/2007 | Tanaka et al. |

FOREIGN PATENT DOCUMENTS

| | | |
|---|---|---|
| WO | 0190230 A1 | 11/2001 |
| WO | 02051559 A2 | 7/2002 |

OTHER PUBLICATIONS

PCT International Search Report, International Application No. PCT/US2009/042459, Date Mailed Aug. 6, 2009.

* cited by examiner

*Primary Examiner* — Ling Choi
*Assistant Examiner* — Hui Chin
(74) *Attorney, Agent, or Firm* — Michaud-Kinney Group LLP

(57) ABSTRACT

A bearing having a surface and a self-lubricating surface coating composition deposited on the surface, wherein the self-lubricating surface coating composition includes a curable acrylate composition having a metallic composition. The metallic composition having a metallic acrylate compound according to Formula I:

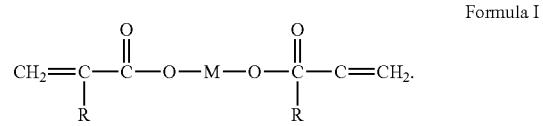

Where R = H or $CH_3$
M = Zn, Ca

21 Claims, 3 Drawing Sheets

SELF-LUBRICATING SURFACE COATING COMPOSITION

CROSS-REFERENCE TO RELATED APPLICATION

This application claims priority benefit under 35 U.S.C. §119(e) of U.S. Provisional Patent Application Ser. No. 61/049,596, filed May 1, 2008, which is hereby incorporated by reference in its entirety.

BACKGROUND

1. Field of the Invention

The present application relates to a self-lubricating surface coating composition and more particularly relates to a bearing that includes a surface with the self-lubricating surface coating composition deposited on at least a portion thereof.

2. Description of Related Art

Deterioration through use or stress, often referred to as "wear", occurs to surfaces, often metal, which are in sliding contact with one another. Pressure, high load weight and repetitive motion can accelerate the rate at which wear occurs. When components having surfaces in sliding contact with one another are employed in machinery, wear can lead to various problems that necessitate repair or replacement of the components. In some circumstances, wear experienced by the surfaces may necessitate replacement of the machinery itself.

To reduce the amount of wear and to alleviate the necessity of frequent repair and replacement of components and/or machines, it is known to treat the surfaces of such components with coating compositions. Coating compositions may also be referred to in the art as liner systems, self-lubricating surface coating compositions or lubricants. Known self-lubricating surface coating compositions include, but are not limited to rubber, ceramic, fabric, and resins with lubricant fillers such as polytetrafluoroethylene (PTFE), graphite, and a molybdenum sulfide. Self-lubricating surface coating compositions reduce the amount of wear and friction experienced by a surface the coating is in contact with, and, as a result, contribute to the longevity and usefulness of the component that defines the surface.

Despite recent improvements in coating composition technology, many self-lubricating surface coating compositions exhibit characteristics such as cracking and fluid absorption susceptibility, which detract from the usefulness of the coating. Many known self-lubricating surface coating compositions are not adaptable for use on all surfaces, such as surfaces on bearings. It has been found that even if a self-lubricating surface coating composition is useful on one bearing configuration or one size bearing, the same self-lubricating surface coating composition may not be useful on different bearing configurations or sizes. Accordingly, a self-lubricating surface coating composition adaptable to many surfaces and having less susceptibility to cracking and fluid absorption, while balancing the amount of wear and friction experienced by the surface and improving overall performance of the surface the coating composition is deposited on, is needed.

SUMMARY

According to aspects illustrated herein, there is provided a bearing including a surface and a self-lubricating surface coating composition deposited on the surface. The self-lubricating surface coating composition includes a curable acrylate composition comprising a metallic composition. The metallic composition includes a metallic acrylate compound according to Formula I:

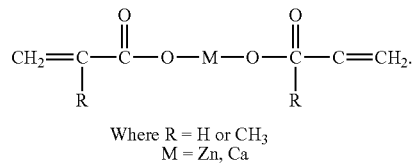

$$CH_2=C-\overset{O}{\underset{R}{\overset{\|}{C}}}-O-M-O-\overset{O}{\underset{R}{\overset{\|}{C}}}-C=CH_2.$$

Where R = H or CH$_3$
M = Zn, Ca

According to other aspects illustrated herein a method of manufacturing a self-lubricating surface coating composition, includes forming a curable acrylate composition comprising a metallic composition, wherein the metallic composition includes a metallic acrylate compound according to Formula I, above. The method also includes combining a lubricant filler, a structural filler and a thixotrope with the curable acrylate composition to form the self-lubricating surface coating composition.

According to other aspects illustrated herein a self-lubricating surface coating composition includes a curable acrylate composition including a metallic composition, comprising a metallic acrylate compound according to Formula I, above. The self-lubricating surface coating composition also includes a lubricant filler such as polytetrafluoroethylene, copper powder, molybdenum disulfide, boron nitride powder, graphite powder or combinations thereof; and a structural filler such as glass fiber, carbon fiber, microwool fiber or combinations thereof. The self-lubricating surface coating composition further includes a thixotrope such as fumed silica, fine polytetrafluoroethylene powder or combinations thereof; and an initiator such as benzoyl peroxide, cumene hydroperoxide, methyl ethyl ketone peroxide, or combinations thereof.

According to other aspects illustrated herein a self-lubricating coating composition includes a curable acrylate composition comprising a metallic composition including zinc monomethacrylate, zinc dimethacrylate and zinc oxide; ethoxylated bisphenol A dimethacrylate; trimethacrylate acid ester; triethylene glycol dimethacrylate; and ethoxylated trimethylolpropane triacrylate. The self-lubricating coating composition also includes a lubricant filler such as polytetrafluoroethylene, copper powder, molybdenum disulfide, boron nitride powder, graphite powder or combinations thereof; and a structural filler such as glass fiber, carbon fiber, microwool fiber or combinations thereof. The self-lubricating coating composition further includes a thixotrope such as fumed silica, fine polytetrafluoroethylene powder or combinations thereof; and an initiator such as benzoyl peroxide, cumene hydroperoxide, methyl ethyl ketone peroxide, or combinations thereof.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION OF PREFERRED EMBODIMENTS

Figure 1:
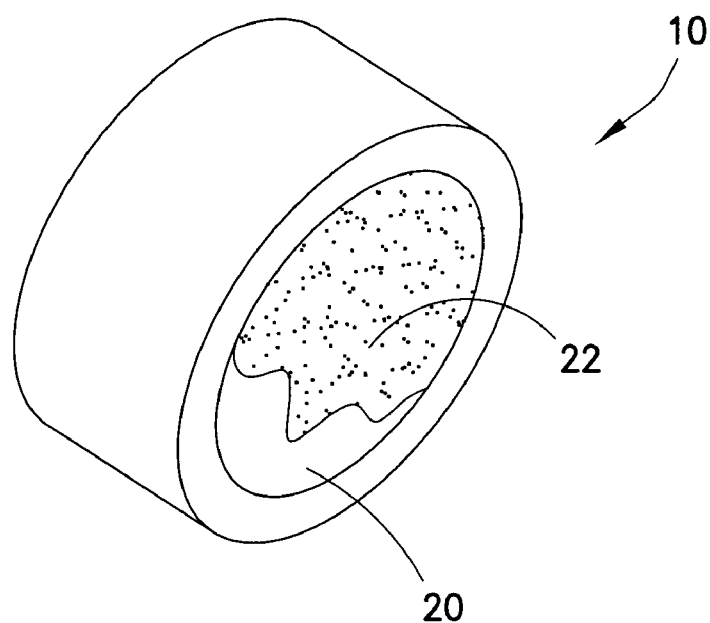
FIG. 1 is a perspective illustration of a plain journal bearing according to one embodiment disclosed herein.
Figure 2:
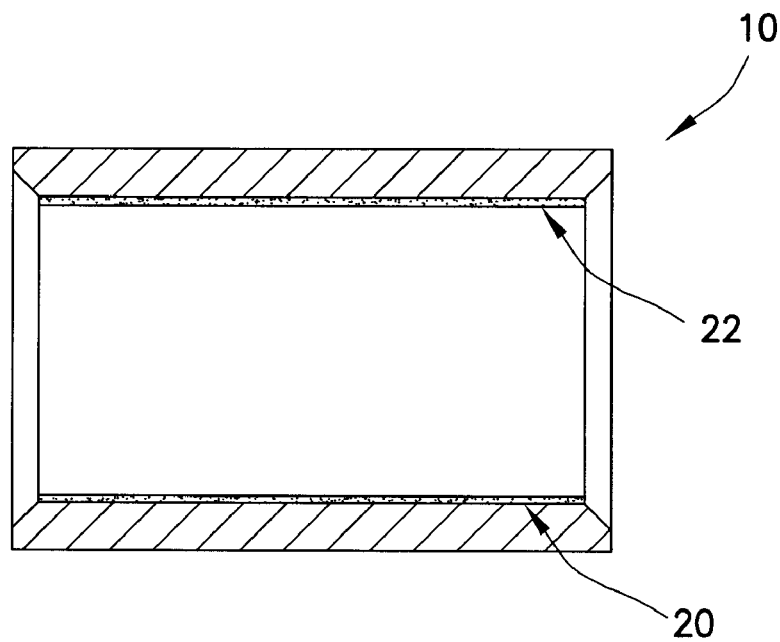
FIG. 2 is a cross-sectional view of a plain journal bearing according to one embodiment disclosed herein.
Figure 3:
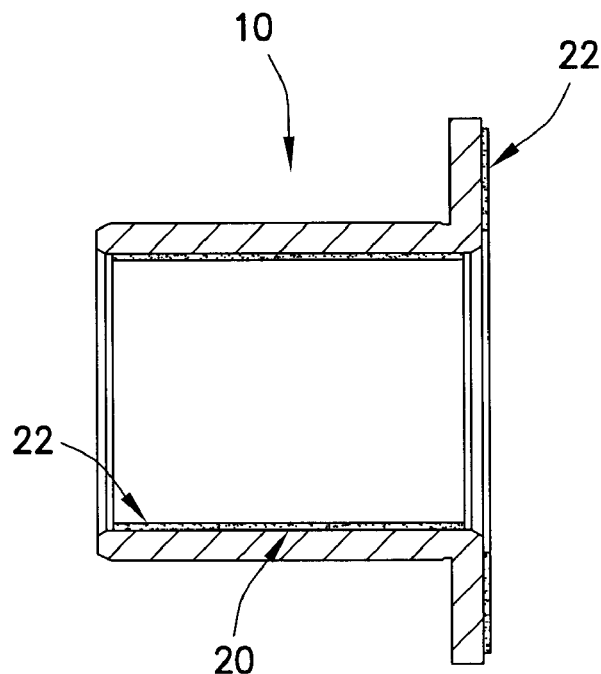
FIG. 3 is a cross-sectional view of a flanged journal bearing according to one embodiment disclosed herein.
Figure 4:
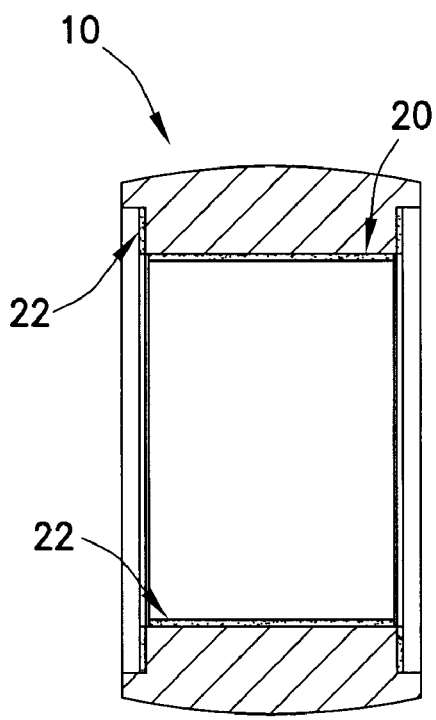
FIG. 4 is a cross-sectional view of an inner ring of a track roller according to one embodiment disclosed herein.
Figure 5:
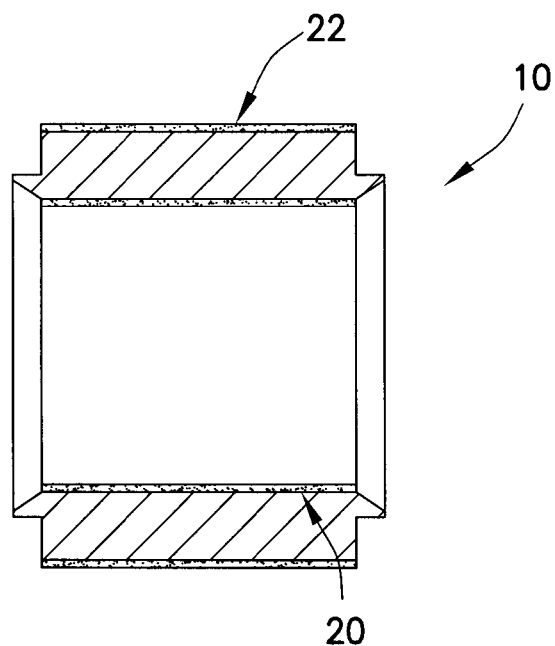
FIG. 5 is a cross-sectional view of an outer ring of a track roller according to one embodiment disclosed herein.
Figure 6:
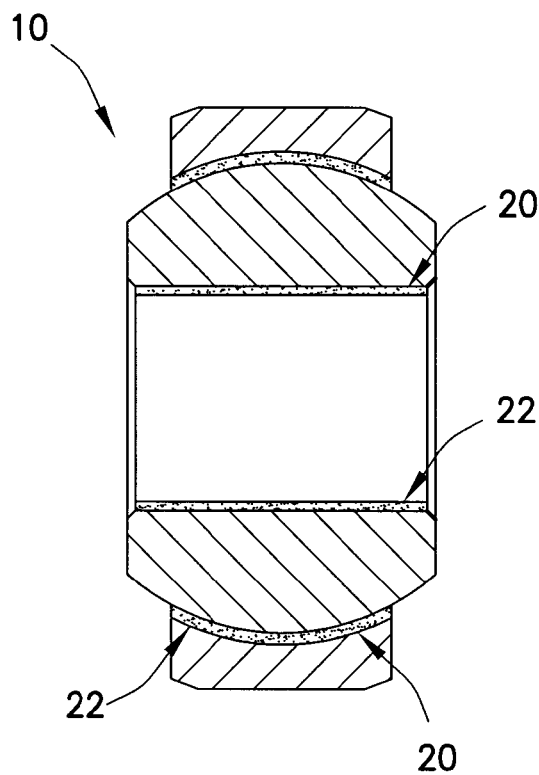
FIG. 6 is a cross-sectional view of a spherical bearing according to one embodiment disclosed herein.

As shown in FIGS. 1-6 a bearing generally designated by the reference number 10 includes at least one surface 20. Surface 20 may be formed from any suitable material, including, but not limited to, titanium, an alloy of titanium, an alloy of tin or lead, aluminum alloys, steel, stainless steel, brass, bronze, cast iron, or a thin layer of silver covered with a thin coating of a soft bearing material. Surface 20 is typically in movable contact with another surface (not shown).

Bearing 10 may be of any type or configuration, including, but not limited to plain journal bearings (shown in FIGS. 1 and 2), stud type or yoke type track rollers (generally shown in FIGS. 4 and 5), stud type or yoke type cam followers, sleeve bearings, flanged journal bearings (shown in FIG. 3), spherical plain bearings (shown in FIG. 6), ball bearings, bushings, slat bearings, roller bearings, and the like.

At least one surface 20 has a self-lubricating surface coating composition 22 deposited on at least a portion thereof. Prior to deposition of the self-lubricating surface coating composition 22, surface 20 may be treated to achieve a desired surface finish. In one example, surface 20 is subjected to an abrasive blasting, which imposes a desired roughness on the surface. Abrasive blasting can be performed by any acceptable method and with any acceptable media such as grit-blasting, sand-blasting or bead-blasting. In one instance, grit-blasting is performed with 20 grit size aluminum oxide. However, it is contemplated that in other instances, different media and different size media, such as silicon carbide, may be utilized in the abrasive blasting.

After achieving the desired surface finish on surface 20, the surface can be cleaned to remove grease and foreign debris. Any method of cleaning that is effective to remove grease and foreign debris can be employed to clean surface 20. Methods of cleaning include, but are not limited to, alkaline cleaning, emulsion cleaning, solvent cleaning, vapor degreasing, acid cleaning, pickling, salt bath scaling, and the like. After surface 20 is cleaned, the surface may be allowed to dry prior to deposition of self-lubricating surface coating composition 22.

Suitable methods for depositing self-lubricating surface coating composition 22 on surface 20 include, but are not limited to spraying, spinning, dipping, injection and any other method effective for depositing a coating on a surface. Once deposited on surface 20, self-lubricating surface coating composition 22 may be cured by any method effective to cure a coating composition on a surface. Self-lubricating surface coating composition 22 may be subsequently machined to particularly desired measurements.

Self-lubricating surface coating composition 22 is generally a coating that may be used in any application that may benefit from such a coating. Self-lubricating surface coating composition 22 includes a curable acrylate composition having a metallic composition that includes a metallic acrylate compound. In addition to the curable acrylate composition, self-lubricating surface coating composition 22 may also include a lubricant filler, and, depending on the application, other additional components, such as structural fillers, thixotropes and initiators.

The curable acrylate composition utilized in self-lubricating surface coating composition 22 may contain a variety of compounds, such as one or more curable acrylates and a metallic composition. The type and amount of compounds present in the curable acrylate composition may vary depending on what application self-lubricating surface coating composition 22 will be used for.

Typically, self-lubricating surface coating composition 22 includes from about 3 mass % to about 50 mass % of the curable acrylate composition, based on the total mass of the self-lubricating surface coating composition. In a specific example, self-lubricating surface coating composition 22 includes from about 4 mass % to about 50 mass % of the curable acrylate composition, based on the total mass of the self-lubricating surface coating composition. In. another example, self-lubricating coating composition 22 includes from about 5 mass % to about 50 mass % of the curable acrylate composition, based on the total mass of the self-lubricating surface coating composition. In a further example, self-lubricating coating composition 22 includes from about 10 mass % to about 50 mass % of the curable acrylate composition, based on the total mass of self-lubricating surface coating composition. In yet another example, self-lubricating coating composition 22 includes from about 10 mass % to about 50 mass % of the curable acrylate composition, based on the total mass of self-lubricating surface coating composition. In a further example, self-lubricating coating composition 22 includes from about 15 mass % to about 50 mass % of the curable acrylate composition, based on the total mass of self-lubricating surface coating composition. In yet a further example, self-lubricating coating composition 22 includes from about 20 mass % to about 50 mass % of the curable acrylate composition, based on the total mass of self-lubricating surface coating composition. In another example, self-lubricating coating composition 22 includes from about 25 mass % to about 50 mass % of the curable acrylate composition, based on the total mass of self-lubricating surface coating composition. In yet a further example, self-lubricating coating composition 22 includes from about 30 mass % to about 50 mass % of the curable acrylate composition, based on the total mass of self-lubricating surface coating composition. In yet another example, self-lubricating coating composition 22 includes from about 35 mass % to about 50 mass % of the curable acrylate composition, based on the total mass of self-lubricating surface coating composition. In another example, self-lubricating coating composition 22 includes from about 40 mass % to about 50 mass % of the curable acrylate composition, based on the total mass of self-lubricating surface coating composition. In a further example, self-lubricating coating composition 22 includes from about 4 mass % to about 45 mass % of the curable acrylate composition, based on the total mass of self-lubricating surface coating composition. In yet a further example, self-lubricating coating composition 22 includes from about 4 mass % to about 40 mass % of the curable acrylate composition, based on the total mass of self-lubricating surface coating composition. In yet a further example, self-lubricating coating composition 22 includes from about 4 mass % to about 35 mass % of the curable acrylate composition, based on the total mass of self-lubricating surface coating composition. In still a further example, self-lubricating coating composition 22 includes from about 4 mass % to about 30 mass % of the curable acrylate composition, based on the total mass of self-lubricating surface coating composition. In a further example, self-lubricating coating composition 22 includes from about 4 mass % to about 25 mass % of the curable acrylate composition, based on the total mass of self-lubricating surface coating composition. In another example, self-lubricating coating composition 22 includes from about 4 mass % to about 20 mass % of the curable acrylate composition, based on the total mass of self-lubricating surface coating composition.

The curable acrylate composition may include a metallic composition. The metallic composition may include a metallic acrylate compound. Use of the metallic acrylate compound in self-lubricating surface coating composition 22 may increase adhesion of the self-lubricating surface coating composition to surface 20.

Use of any known metallic acrylate compound is envisioned. However, in one specific example, the metallic acrylate has a structure according to Formula I:

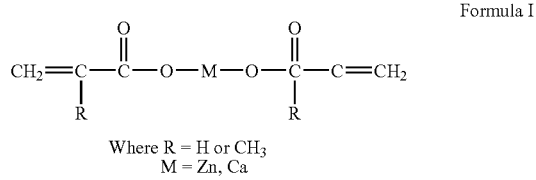

Where R = H or CH₃
M = Zn, Ca

The metallic composition in the curable acrylate composition may also include a metallic oxide. Examples of metallic oxides include but are not limited to zinc oxide and calcium oxide.

In one specific example, the metallic composition includes zinc monomethacrylate and zinc dimethacrylate as the metallic acrylate compounds and zinc oxide as the metallic oxide compound. Zinc oxide is commercially available as SR709, sold by the Sartomer Company, Exton, Pa.

Self-lubricating surface coating composition 22 typically includes from about 3 mass % to about 10 mass % of the metallic composition based on the total mass of the self-lubricating surface coating composition. In another example, self-lubricating surface coating composition 22 includes from about 4 mass % to about 8 mass % of the metallic composition, based on the total mass of the self-lubricating surface coating composition. In a further example, self-lubricating surface coating composition 22 includes from about 4 mass % to about 5 mass % of the metallic composition, based on the total mass of the self-lubricating surface coating composition. In yet a further example, self-lubricating surface coating composition 22 includes 4.43 mass % of the metallic composition, based on the total mass of the self-lubricating surface coating composition.

In addition to the metallic composition, the curable acrylate composition may also include ethoxylated bisphenol A dimethacrylate. The ethoxylated bisphenol A dimethacrylate may be either a two (2) mole, four (4) mole, eight (8) mole or ten (10) mole monomer. In one example, four mole ethoxylated bisphenol A dimethacrylate is used and is commercially available as SR540, sold by the Sartomer Company, Exton, Pa.

Self-lubricating coating composition 22 may include from about 10 mass % to about 20 mass % of the ethoxylated bisphenol A dimethacrylate, based on the total mass of the self-lubricating surface coating composition. In a specific example, self-lubricating surface coating composition 22 includes from about 12 mass % to about 18 mass % of the ethoxylated bisphenol A dimethacrylate, based on the total mass of the self-lubricating surface coating composition. In another example, self-lubricating surface coating composition 22 includes from about 10 mass % to about 14 mass % of the ethoxylated bisphenol A dimethacrylate, based on the total mass of the self-lubricating surface coating composition. In yet a further example, self-lubricating surface coating composition 22 includes 13.44 mass % of the ethoxylated bisphenol A dimethacrylate, based on the total mass of the self-lubricating surface coating composition.

The curable acrylate composition present in self-lubricating surface coating composition 22 may further include trimethylacrylate acid ester, which is commercially available as CD9053, sold by the Sartomer Company, Exton, Pa. Generally, self-lubricating surface coating composition 22 includes from about 3 mass % to about 20 mass % of the trimethylacrylate acid ester, based on the total mass of the self-lubricating surface coating composition. In a specific example, self-lubricating surface coating composition 22 includes from about 3 mass % to about 15 mass % of the trimethylacrylate acid ester, based on the total mass of the self-lubricating surface coating composition. In another example, self-lubricating surface coating composition 22 includes from about 4 mass % to about 10 mass % of the trimethylacrylate acid ester, based on the total mass of the self-lubricating surface coating composition. In yet another example, self-lubricating surface coating composition 22 includes 4.43 mass % of the trimethylacrylate acid ester, based on the total mass of the self-lubricating surface coating composition.

The curable acrylate composition present in self-lubricating surface coating composition 22 may also include triethylene glycol dimethacrylate, which is commercially available as SR205, sold by the Sartomer Company, Exton, Pa. Self-lubricating surface coating composition 22 may include from about 10 mass % to about 20 mass % of the triethylene glycol dimethacrylate, based on the total mass of the self-lubricating surface coating composition. In one example, self-lubricating surface coating composition 22 includes from about 12 mass % to about 18 mass % of the triethylene glycol dimethacrylate, based on the total mass of the self-lubricating surface coating composition. In yet another example, self-lubricating surface coating composition 22 includes from about 10 mass % to about 14 mass % of the triethylene glycol dimethacrylate, based on the total mass of the self-lubricating surface coating composition. In yet a further example, self-lubricating surface coating composition 22 includes 13.44 mass % of the triethylene glycol dimethacrylate, based on the total mass of the self-lubricating surface coating composition.

Additionally, the curable acrylate composition present in self-lubricating surface coating composition 22 may include ethoxylated trimethylolpropane triacrylate, which is commercially available as SR454, sold by the Sartomer Company, Exton, Pa. Self-lubricating surface coating composition 22 may include from about 10 mass % to about 20 mass % of the ethoxylated trimethylolpropane triacrylate, based on the total mass of the self-lubricating surface coating composition. In one example, self-lubricating surface coating composition 22 includes from about 12 mass % to about 18 mass % of the ethoxylated trimethylolpropane triacrylate, based on the total mass of the self-lubricating surface coating composition. In another example, self-lubricating surface coating composition 22 includes from about 10 mass % to about 14 mass % of the ethoxylated trimethylolpropane triacrylate, based on the total mass of the self-lubricating surface coating composition. In a further example, self-lubricating surface coating composition 22 includes 13.44 mass % of ethoxylated trimethylolpropane triacrylate, based on the total mass of the self-lubricating surface coating composition.

Self-lubricating surface coating composition 22 may also include a lubricant filler. Lubricant fillers are generally known in the art and include, but are not limited to: polytetrafluoroethylene (PTFE), copper powder, molybdenum disulfide, boron nitride powder, graphite powder and combinations thereof. In one example of self-lubricating surface coating composition 22, the lubricant filler is polytetrafluoroethylene (PTFE). The PTFE may be treated with compounds containing hydroxyl or carboxylic acid groups, or a sodium naphthalene complex in glycol ether to enhance bonding with the curable acrylate composition.

The PTFE may be used in either flock form, powder form or a combination thereof. PTFE is commercially available in untreated flock form from Toray Fluorofibers America, Decatur, Ala., and is available in surface treated flock form as Aclon® from Acton Technologies, Pittston, Pa. PTFE in powder form is commercially available as UF-8TA, sold by Laurel Products LLC, Elverson, Pa. When a combination of flock and powder form is utilized, the flock to powder mass ratio is between about 3:1 to about 8:1. In one example, the flock to powder mass ratio is 5:1. The mean flock length of the PTFE in flock form is between about 0.008 inches and 0.015 inches.

When utilized, the lubricant filler is added to self-lubricating surface coating composition 22 in an amount that facilitates low friction properties of the self-lubricating surface coating composition. Generally, self-lubricating surface coating composition 22 includes at least 20 mass % of the lubricant filler, based on the total mass of the self-lubricating surface coating composition. In one example self-lubricating surface coating composition 22 includes from about 20 mass % to about 50 mass % of the lubricant filler, based on the total mass of the self-lubricating surface coating composition. In another example, self-lubricating surface coating composition 22 includes from about 20 mass % to about 35 mass % of the lubricant filler, based on the total mass of the self-lubricating surface coating composition.

In addition to the above components, self-lubricating surface coating composition 22 may also include a structural filler. Structural fillers reinforce coating compositions and facilitate the reduction of overall wear of the composition. Structural fillers are generally known in the art and include, but are not limited to glass fiber, carbon fiber, microwool fiber and combinations thereof. In one example of self-lubricating surface coating composition 22, the structural filler is glass fiber, which has been treated with silane. Glass fiber is commercially available as Microglass™ 9007D, sold by Fibertec, Inc. of Bridgewater, Mass. The glass fibers typically have a length between about 0.005 inches and about 0.015 inches. In a specific example, the glass fibers have a length between about 0.005 inches and about 0.008 inches.

Self-lubricating surface coating composition 22 may contain between about 15 mass % to about 50 mass % of the structural filler, based on the total mass of the self-lubricating surface coating composition. In one example, self-lubricating surface coating composition 22 may contain between about 15 mass % to about 30 mass % of the structural filler, based on the total mass of the self-lubricating surface coating composition. In another example, self-lubricating surface coating composition 22 may contain between about 15 mass % to about 20 mass % of the structural filler, based on the total mass of the self-lubricating surface coating composition. In another example, self-lubricating surface coating composition 22 may contain about 17 mass % of the structural filler, based on the total mass of the self-lubricating surface coating composition.

The amount of fillers, both structural fillers and lubricant fillers, used in self-lubricating surface coating composition 22 may be modified to increase or decrease the viscosity of the self-lubricating coating composition. Self-lubricating surface coating composition 22 should be thick enough to hold the fillers in suspension, but should also be thin enough to allow easy application to a surface. In general, the total amount of filler in self-lubricating surface coating composition 22 is at least 40 mass % based on the total mass of the self-lubricating surface coating composition. In one example, the total amount of filler(s) present in self-lubricating surface coating composition 22 is between 40 mass % and 60 mass % based on the total mass of the self-lubricating surface coating composition.

The viscosity of self-lubricating surface coating composition 22 may also be altered by the addition of a thixotrope. Thixotropes are chemicals or compounds that increase the viscosity or thickness of a substance while allowing flow to occur under pressure. Thixotropes may aid in the handling of self-lubricating surface coating composition 22. Thixotropes are known in the art and include, but are not limited to fumed silica, fine PTFE powder and combinations thereof. Fumed silica is commercial available as Aerosil® 200, sold by Evonik, Essen, Germany. Fine PTFE powder is commercially available as UF-8TA, sold by Laurel Products LLC, Elverson, Pa. In one example, self-lubricating surface coating composition 22 includes both fumed silica and fine PTFE powder. When fine PTFE powder is utilized in self-lubricating surface coating composition 22, it may act as both a thixotrope and a lubricant filler.

The amount of thixotropes used in self-lubricating surface coating composition 22 may vary depending on the viscosity and thixotropic properties of the self-lubricating surface coating composition. Typically, self-lubricating surface coating composition 22 includes between about 0.5 mass % and about 10 mass % of one or more thixotropes, based on the total mass of the self-lubricating surface coating composition. In one example, self-lubricating surface coating composition 22 includes between about 0.5 mass % and about 7 mass % of one or more thixotropes, based on the total mass of the self-lubricating surface coating composition. In another example, self-lubricating surface coating composition 22 includes between about 1.5 mass % and about 6.5 mass % of one or more thixotropes, based on the total mass of the self-lubricating surface coating composition.

Self-lubricating surface coating composition 22 may also include an initiator. The initiator adds crosslinking density to self-lubricating surface coating composition 22 by facilitating a complete cure of the self-lubricating surface coating composition. Initiators are generally known in the art and include, but are not limited to, organic peroxide compositions. Specific examples of initiators include, but are not limited to benzoyl peroxide, cumene hydroperoxide, methyl ethyl ketone peroxide and combinations thereof. In one specific example of self-lubricating surface coating composition 22, cumene hydroperoxide is used as the initiator, which is commercially available from Sigma Aldrich Corporation, St. Louis, Mo.

The addition of too much initiator can limit the pot life of self-lubricating surface coating composition 22. However, not enough initiator may lead to an incomplete cure of self-lubricating surface coating composition 22. Accordingly, self-lubricating surface coating composition 22 generally contains between about 0.5 mass % and about 3.0 mass % of an initiator based on the total mass of the self-lubricating surface coating composition. In one specific example, self-lubricating surface coating composition 22 includes between about 1 mass % and about 1.5 mass percent % of an initiator based on the total mass of the self-lubricating surface coating composition.

Manufacture of self-lubricating surface coating composition 22 may be done by any method acceptable to manufacture a surface coating composition. In general, the method of manufacturing self-lubricating surface coating composition 22 may involve combining the various components in the various quantities described above. Typically, the components of self-lubricating surface coating composition 22 may be added, mixed or combined, in any order. However, any initiator utilized in self-lubricating surface coating composition 22 is typically added just prior to the self-lubricating surface coating composition being deposited on a surface 20.

The method of manufacturing self-lubricating surface coating composition 22 may include combining the components that form the curable acrylate composition and then combining the curable acrylate composition with one or more of the lubricant filler(s), the structural filler(s) and the thixotrope(s). As noted above, combination of the components of self-lubricating surface coating composition 22 with an initiator may be done just prior to deposition of the self-lubricating surface coating composition on a surface.

In one example, self-lubricating surface coating composition 22 is manufactured by combining components to form the curable acrylate composition. For instance, the curable acrylate composition is manufactured by combining a metallic composition, which includes a metallic acrylate compound, with one or more of ethoxylated bisphenol A dimethacrylate, trimethacrylate acid ester, and ethoxylated trimethylolpropane triacrylate.

Additional components of self-lubricating surface coating composition 22, such as lubricant fillers, structural fillers and thixotropes, are combined with the components of the curable acrylate composition. The components are typically combined by mixing until uniform. Mixing may be done by any known method or apparatus, including planetary mixers, hand mixing, stirring by a stir rod or stir bar, high shear mixer, or the like.

It is typical to ensure that the lubricant fillers, structural fillers and thixotropes are substantially dry prior to combining them with the curable acrylate composition. To ensure dryness, the fillers and thixotropes may be kept in an oven between one hundred twenty degrees Fahrenheit (120° F.) and one hundred forty degrees Fahrenheit (140° F.) for at least one day prior to use, however any known method or apparatus for drying, such as vacuums and dessicants, may be utilized.

Prior to depositing self-lubricating surface coating composition 22 on surface 20, an initiator is combined with the mixture of fillers, thixotropes and curable acrylate composition. The mixture is combined until a uniform consistency is reached. The mixture is placed in a mixing vacuum chamber to remove air and decrease voids in the mixture and subsequent final product. The mixture remains in the vacuum chamber until substantially all of the air has been degassed from the composition. The amount of time the mixture remains in the vacuum will vary, but typically the mixture will remain in the vacuum between 15 minutes to 45 minutes. The vacuum is typically between 27 and 29 inches of mercury (inHg).

After mixing the components to manufacture self-lubricating surface coating composition 22, the composition may be deposited on any surface, such as surface 20 of bearing 10. As previously mentioned, surface 20 may be prepared to obtain a desired finish and then cleaned to remove grease and foreign debris. Self-lubricating surface coating composition 22 may be deposited onto a surface by any generally accepted deposition method, including, but not limited to spraying, spinning, dipping, injection and any other methods acceptable for depositing a coating on a surface.

In general, the amount of self-lubricating surface coating composition 22 deposited on a surface is dependent on the application the surface will be utilized in. Typically, self-lubricating coating composition 22 is deposited on a surface in an amount sufficient to coat the surface to obtain a thickness of at least 0.001 inch, although more or less of the self-lubricating composition may be used if desired.

Once deposited on a surface, such as surface 20, self-lubricating surface coating composition 22 may be cured. Curing can be accomplished by any acceptable method, including, but not limited to, heat with pressure, heat without pressure, spinning and curing via induction or hot air, and the like. In one example, self-lubricating surface coating composition is cured by using heat and pressure, where the temperature is about two hundred fifty degrees Fahrenheit (250° F.) and the pressure is greater than 60 PSIG for a time period sufficient to cure the self-lubricating surface coating composition. Cure time varies based on the method used to cure self-lubricating surface coating composition 22 as well as the geometry and shape of bearing 10 which the self-lubricating surface coating composition is deposited on. In one example, when curing is performed with heat and pressure, cure time is between about twenty (20) minutes to about sixty (60) minutes. After curing, self-lubricating surface coating composition 22 may be machined to precise dimensions.

Non-limiting examples of preparing the self-lubricating surface coating composition and bearing are provided below. Unless otherwise noted, amounts are given in mass percent (mass %) and temperature is given in degrees Fahrenheit (° F.).

EXAMPLES

Example 1

Manufacture of a Self-Lubricating Surface Coating Composition

A self-lubricating surface coating composition is manufactured by forming a curable acrylate composition by combining the following components in a vessel:

| Component | Amount (Mass %) |
|---|---|
| Trimethacrylate Acid Ester[1] | 4.43 |
| Metallic Arcylate Compound[2] | 4.43 |
| Triethylene glycol dimethacrylate[3] | 13.44 |
| Ethoxylated (3) trimethylolpropoane triacrylate[4] | 13.44 |
| Ethoxylated (4) bisphenol A dimethacrylate[5] | 13.44 |

[1]CD9053, sold by the Sartomer Company, Exton, Pennsylvania.
[2]Metallic Diacrylate, commercially available as SR709, sold by the Sartomer Company, Exton, Pennsylvania.
[3]SR205, sold by the Sartomer Company, Exton, Pennsylvania.
[4]SR454, sold by the Sartomer Company, Exton, Pennsylvania.
[5]SR540, sold by the Sartomer Company, Exton, Pennsylvania.

In the same vessel, the curable acrylate composition is combined with the following structural fillers, lubricant fillers and thixotropes:

| Component | Amount (Mass %) |
|---|---|
| PTFE Fiber[6] | 26.00 |
| Glass Fiber[7] | 17.00 |
| Fumed Silica[8] | 1.50 |
| PTFE Powder[9] | 5.00 |

[6]Aclon ®, sold by Acton Technologies, Pittston, Pennsylvania
[7]Microglass ™ 9007D, sold by Fibertec, Inc. of Bridgewater, Massachusetts
[8]Aerosil ® 200, sold by Evonik, Essen, Germany
[9]UF-8TA, sold by Laurel Products LLC, Elverson, Pennsylvania The structural fillers, lubricant fillers and thixotropes should be substantially dry prior to combination with the curable acrylate composition. To ensure dryness of the fillers and thixotropes, the structural fillers, lubricant fillers and thixotropes may be kept in an oven at 120° F. to 140° F. for at least twenty-four (24) hours.

The combination of curable acrylate composition, fillers and thixotropes, is combined with 1.33 mass % of cumene hydroperoxide as an initiator to form the self-lubricating surface coating composition. The self-lubricating surface coating composition is placed in a mixing vacuum chamber at between about 27 and 29 inHg until all the air has been degassed from the composition.

Example 2

Manufacture of a Bearing with a Self-Lubricating Surface Coating Composition

Bearings having at least one surface with a self-lubricating surface coating composition deposited thereon are manufactured by preparing a self-lubricating surface coating composition in accordance with Example 1 and depositing it on a surface of a bearing as follows:

Several flanged bushings ranging in size from 0.5 inch diameter bore to 1.5 inch diameter bore are prepared for deposition of the self-lubricating surface coating composition by grit-blasting the surfaces of the bushings with 20 grit size aluminum oxide and then cleaning the surfaces by an alkaline cleaning method. After rinsing the bushings in an alkaline cleaner, the bushings are rinsed with water to remove remaining alkaline cleaner present on the bearing. The bushings are allowed to dry prior to deposition of the self-lubricating surface coating composition.

The bushings used are in accordance with AS81934/2 having RBC part number M81934/2-D(alloy)L, where "D" is the nominal bore diameter in sixteenths of an inch, "alloy" is either A (Aluminum alloy SAE-AMS-QQ-A-200/3 or SAE-AMS-QQ-A-225/6A (2024T851 or 2024T8511)) or C (corrosion resistant steel, SAE AMS 5643 (17-4 PH) condition H1150 per SAE-AMS-H-6875) and "L" is the nominal length of the bushing in thirty-seconds (1/32) of an inch.

The self-lubricating surface coating composition of Example 1 is deposited on a surface of the bushings by injection into a mold containing the bushing. The bushings are placed in a cure vessel at 250° F. and at least at a pressure of 60 psi for approximately 30 minutes. The bushings are then placed in an oven at 350° F. for one hour. The coating is then machined to obtain a final thickness of between about 0.008 and 0.009 inches.

Example 3

Several flanged bushings ranging in size from 0.5 inch diameter bore to 1.5 inch diameter bore Bushings according to Example 2 are subjected to an oscillation test in accordance with SAE-AS81934. The bushings of Example 2 are compared to commercially available flanged bushings, having non standard dimensions, being most comparable to part nos.: M81934/2-08C012 and M81934/2-16C022, which include a self-lubricating surface coating composition deemed to be in accordance with SAE-AS81934. The commercially available flanged bushings are indicated in the chart as "custom".

All test bearings having self-lubricating surface coating compositions according to Example 2 have less than the maximum allowable wear of 0.006 inch at 25,000 cycles at 325° F. having 37.5 KSI load.

The wear of the self-lubricating surface coating composition is measured and the results are recited in Table 1:

TABLE 1

| Sample Bushing | Trial | Self-lubricating surface coating composition of Example 2 Wear (in.) | Self-lubricating surface coating composition of commercial bushings Wear (in.) |
|---|---|---|---|
| 08A012 | 1 | 0.0002 | * |
|  | 2 | 0.0002 | * |
|  | 3 | 0.0001 | * |
| 08C012 | 1 | 0.0017 | * |
|  | 2 | 0.0012 | * |
|  | 3 | 0.0008 | * |
| 08Ccustom | 1 | * | — |
|  | 2 | * | — |
|  | 3 | * | — |
|  | 4 | * | 0.0012 |
| 16A016 | 1 | 0.0005 | * |
|  | 2 | 0.0005 | * |
|  | 3 | 0.0002 | * |
| 16C016 | 1 | 0.0001 | * |
|  | 2 | 0.0003 | * |
|  | 3 | 0.0005 | * |
| 16Ccustom | 1 | * | 0.0008 |
|  | 2 | * | — |
|  | 3 | * | * |
| 24A016 | 1 | 0.0005 | * |
|  | 2 | 0.0013 | * |
|  | 3 | 0.0009 | * |
| 24A016 | 1 | 0.0044 | * |
|  | 2 | 0.0015 | * |
|  | 3 | 0.0014 | * |

"—" indicates the bushing had more than the maximum allowable wear of 0.006 inch at 25,000 cycles at 325° F. having 37.5 KSI load.
"*" no test performed for this size sample.

What is claimed is:

1. A self-lubricating surface coating composition comprising:
a curable acrylate composition comprising:
a metallic composition, comprising a metallic acrylate compound according to Formula I:

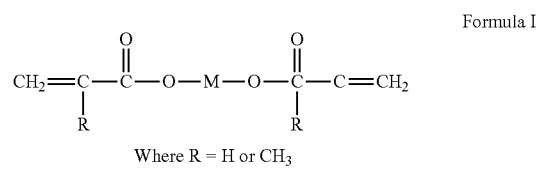

Where R = H or CH$_3$
M = Zn, Ca wherein said metallic composition further comprises a metallic oxide;
wherein said metallic oxide is selected from zinc oxide or calcium oxide; and
wherein said metallic composition comprises:

zinc monomethacrylate;
zinc dimethacrylate; and
zinc oxide.

2. A self-lubricating surface coating composition according to claim 1, wherein said curable acrylate composition further comprises at least one of exthoxylated bisphenol A dimethacrylate, trimethacrylate acid ester, triethylene glycol dimethacrylate, ethoxylated trimethylolpropane triacrylate, or combinations thereof.

3. A self-lubricating surface coating composition according to claim 1, comprising between about 3 mass % to about 50 mass % of said curable acrylate composition, based on the total mass of said self-lubricating surface coating composition.

4. A self-lubricating coating composition comprising:
a curable acrylate composition comprising: a metallic composition comprising zinc monomethacrylate, zinc dimethacrylate and zinc oxide; ethoxylated bisphenol A dimethacrylate; trimethacrylate acid ester; triethylene glycol dimethacrylate; and ethoxylated trimethylolpropane triacrylate;
a lubricant filler selected from polytetrafluoroethylene, copper powder, molybdenum disulfide, boron nitride powder, graphite powder or combinations thereof;
a structural filler selected from glass fiber, carbon fiber, microwool fiber or combinations thereof;
a thixotrope selected from fumed silica, fine polytetrafluoroethylene powder or combinations thereof; and
an initiator selected from benzoyl peroxide, cumene hydroperoxide, methyl ethyl ketone peroxide, or combinations thereof.

5. A self-lubricating surface coating composition according to claim 1 wherein said curable acrylate composition comprises a lubricant filler selected from polytetrafluoroethylene, copper powder, molybdenum disulfide, boron nitride powder, graphite powder or combinations thereof.

6. A self-lubricating surface coating composition according to claim 5 wherein said self-lubricating surface coating composition comprises at least 20 mass % of said lubricant filler, based on the total mass of said self-lubricating surface coating composition.

7. A self-lubricating surface coating composition according to claim 5, wherein said lubricant filler is polytetrafluoroethylene.

8. A self-lubricating surface coating composition according to claim 7, wherein said polytetrafluoroethylene is in powder form, flock form, or combinations thereof.

9. A self-lubricating surface coating composition according to claim 1, wherein said curable acrylate composition comprises a structural filler selected from glass fiber, carbon fiber, microwool fiber or combinations thereof.

10. A self-lubricating surface coating composition according to claim 1, wherein said curable acrylate composition comprises a thixotrope selected from fumed silica, fine polytetrafluoroethylene powder or combinations thereof.

11. A self-lubricating surface coating composition according to claim 1, wherein said curable acrylate composition comprises an initiator selected from benzoyl peroxide, cumene hydroperoxide, methyl ethyl ketone peroxide, or combinations thereof.

12. A self-lubricating surface coating composition comprising:
a curable acrylate composition comprising:
a metallic composition, comprising a metallic acrylate compound according to Formula I:

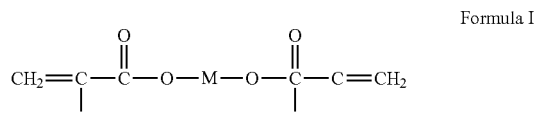

Where R = H or CH$_3$
M = Zn, Ca wherein said metallic composition further comprises a metallic oxide;
wherein said curable acrylate composition comprises a lubricant filler selected from polytetrafluoroethylene, copper powder, molybdenum disulfide, boron nitride powder, graphite powder or combinations thereof; and
wherein said self-lubricating surface coating composition comprises at least 20 mass % of said lubricant filler, based on the total mass of said self-lubricating surface coating composition.

13. A self-lubricating surface coating composition according to claim 12 wherein said curable acrylate composition further comprises at least one of exthoxylated bisphenol A dimethacrylate, trimethacrylate acid ester, triethylene glycol dimethacrylate, ethoxylated tri methylolpropane triacrylate, or combinations thereof.

14. A self-lubricating surface coating composition according to claim 12, wherein said metallic oxide is selected from zinc oxide or calcium oxide.

15. A self-lubricating surface coating composition according to claim 14, wherein said metallic composition comprises:
zinc monomethacrylate;
zinc dimethacrylate; and
zinc oxide.

16. A self-lubricating surface coating composition according to claim 12, comprising between about 3 mass % to about 50 mass % of said curable acrylate composition, based on the total mass of said self-lubricating surface coating composition.

17. A self-lubricating surface coating composition according to claim 12, wherein said lubricant filler is polytetrafluoroethylene.

18. A self-lubricating surface coating composition according to claim 17, wherein said polytetrafluoroethylene is in powder form, flock form, or combinations thereof.

19. A self-lubricating surface coating composition according to claim 12, wherein said curable acrylate composition comprises a structural filler selected from glass fiber, carbon fiber, microwool fiber or combinations thereof.

20. A self-lubricating surface coating composition according to claim 12, wherein said curable acrylate composition comprises a thixotrope selected from fumed silica, fine polytetrafluoroethylene powder or combinations thereof.

21. A self-lubricating surface coating composition according to claim 12, wherein said curable acrylate composition comprises an initiator selected from benzoyl peroxide, cumene hydroperoxide, methyl ethyl ketone peroxide, or combinations thereof.

* * * * *

UNITED STATES PATENT AND TRADEMARK OFFICE
CERTIFICATE OF CORRECTION

PATENT NO.        : 8,034,865 B2
APPLICATION NO.   : 12/433926
DATED             : October 11, 2011
INVENTOR(S)       : Gregg L. Hamel et al.

It is certified that error appears in the above-identified patent and that said Letters Patent is hereby corrected as shown below:

IN THE ABSTRACT

Replace Formula I with the following Formula I:

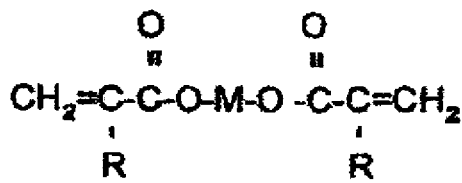

Where    R = H or CH₃
         M = Zn, Ca

IN THE SPECIFICATION

Column 2, Line 5: Replace Formula I with the following Formula I:

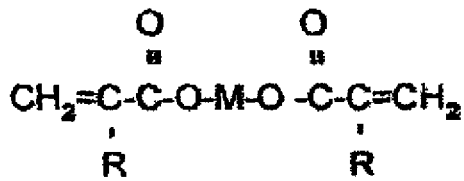

Where    R = H or CH₃
         M = Zn, Ca

Signed and Sealed this
Fifteenth Day of July, 2014

Michelle K. Lee
*Deputy Director of the United States Patent and Trademark Office*

CERTIFICATE OF CORRECTION (continued)
U.S. Pat. No. 8,034,865 B2

Column 5, Line 19: Replace Formula I with the following Formula I:

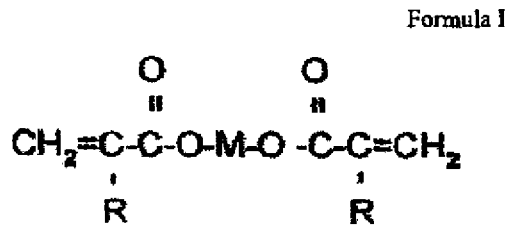

Where      R = H or CH$_3$
                M = Zn, Ca

IN THE CLAIMS

Claim 1
Column 12, Line 53: Replace Formula I with the following Formula I:

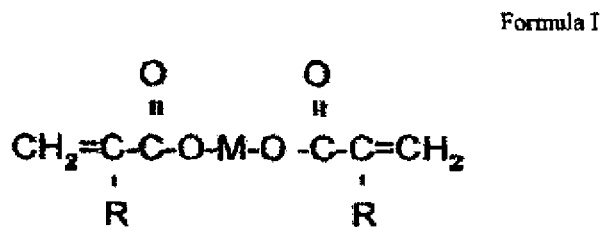

Where      R = H or CH$_3$
                M = Zn, Ca

Claim 12
Column 14, Line 5: Replace Formula I with the following Formula I:

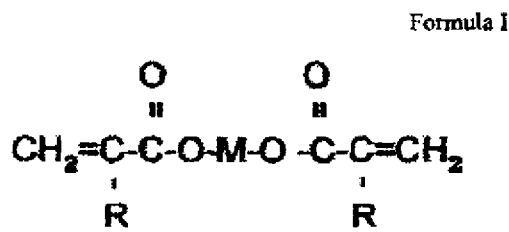

Where      R = H or CH$_3$
                M = Zn, Ca